(12) United States Patent
Kawamoto et al.

(10) Patent No.: US 10,024,243 B2
(45) Date of Patent: Jul. 17, 2018

(54) VEHICLE DRIVING DEVICE AND VEHICLE DRIVING METHOD

(75) Inventors: Yoshinobu Kawamoto, Atsugi (JP);
Masahiro Iriyama, Yokohama (JP)

(73) Assignee: NISSAN MOTOR CO., LTD.,
Yokohama-shi (JP)

( * ) Notice: Subject to any disclaimer, the term of this patent is extended or adjusted under 35 U.S.C. 154(b) by 80 days.

(21) Appl. No.: 14/344,136

(22) PCT Filed: Jun. 28, 2012

(86) PCT No.: PCT/JP2012/066542
§ 371 (c)(1),
(2), (4) Date: Mar. 11, 2014

(87) PCT Pub. No.: WO2013/038778
PCT Pub. Date: Mar. 21, 2013

(65) Prior Publication Data
US 2014/0338635 A1 Nov. 20, 2014

(30) Foreign Application Priority Data
Sep. 12, 2011 (JP) ................................ 2011-198435

(51) Int. Cl.
*F02M 7/00* (2006.01)
*F02D 11/02* (2006.01)
(Continued)

(52) U.S. Cl.
CPC .............. *F02D 11/02* (2013.01); *B60W 10/06* (2013.01); *B60W 10/115* (2013.01);
(Continued)

(58) Field of Classification Search
CPC ...... F01L 13/06; F02D 41/123; F02D 41/126; F02D 11/02; F02D 41/023;
(Continued)

(56) References Cited

U.S. PATENT DOCUMENTS

| 5,233,888 A * | 8/1993 | Fukuda | ................. B60W 10/06 477/30 |
| 2009/0118092 A1* | 5/2009 | Doering | .............. F02D 19/0692 477/107 |

(Continued)

FOREIGN PATENT DOCUMENTS

| JP | 2-291434 A | 12/1990 |
| JP | 2002-48224 | 2/2002 |

(Continued)

*Primary Examiner* — Lindsay Low
*Assistant Examiner* — Omar Morales
(74) *Attorney, Agent, or Firm* — Foley & Lardner LLP

(57) ABSTRACT

An automatic transmission performs a shift-up operation when the accelerator pedal is released from a depression during a vehicle is running. An engine rotation speed immediately after the shift-up operation is predicted on the basis of the engine rotation speed and a gear ratio of the transmission after the shift-up operation. When a fuel recovery is predicted to be performed immediately after the shift-up operation, the fuel recovery is advanced such that it is performed in the inertial phase of the transmission.

9 Claims, 8 Drawing Sheets

(51) Int. Cl.
*F02D 41/02* (2006.01)
*F02D 41/12* (2006.01)
*B60W 10/06* (2006.01)
*B60W 10/115* (2012.01)
*B60W 30/19* (2012.01)
*F16H 63/50* (2006.01)
*F16H 61/04* (2006.01)
*F16H 59/18* (2006.01)
*F16H 59/36* (2006.01)
*F02D 41/14* (2006.01)

(52) U.S. Cl.
CPC ......... *B60W 30/19* (2013.01); *F02D 41/0215* (2013.01); *F02D 41/126* (2013.01); *F16H 61/0437* (2013.01); *F16H 63/50* (2013.01); *B60W 2510/0638* (2013.01); *B60W 2510/101* (2013.01); *B60W 2540/10* (2013.01); *B60W 2710/0627* (2013.01); *B60W 2710/0666* (2013.01); *F02D 41/023* (2013.01); *F02D 2041/1412* (2013.01); *F02D 2200/101* (2013.01); *F16H 2059/186* (2013.01); *F16H 2059/366* (2013.01)

(58) Field of Classification Search
CPC ......... F02D 41/0215; F02D 2041/1412; F02D 2200/101; F02M 3/00; B60W 10/06; B60W 30/19; B60W 2510/0638; B60W 2510/101; B60W 2540/10; B60W 2710/024; B60W 2710/0627; B60W 2710/0677; B60W 2710/0666; B60W 2710/0644
USPC ........................... 123/344, 320, 325; 477/77
See application file for complete search history.

(56) References Cited

U.S. PATENT DOCUMENTS

| | | | |
|---|---|---|---|
| 2010/0056332 A1* | 3/2010 | Kobayashi | B60W 10/06 477/110 |
| 2010/0131160 A1* | 5/2010 | Ayabe | F02D 31/007 701/54 |
| 2010/0250074 A1* | 9/2010 | Hirasako | B60W 30/18072 701/55 |

FOREIGN PATENT DOCUMENTS

| | | |
|---|---|---|
| JP | 2006-15819 A | 1/2006 |
| JP | 2010-78124 A | 4/2010 |
| JP | 2010-125874 A | 6/2010 |
| JP | 2010-223403 A | 10/2010 |

\* cited by examiner

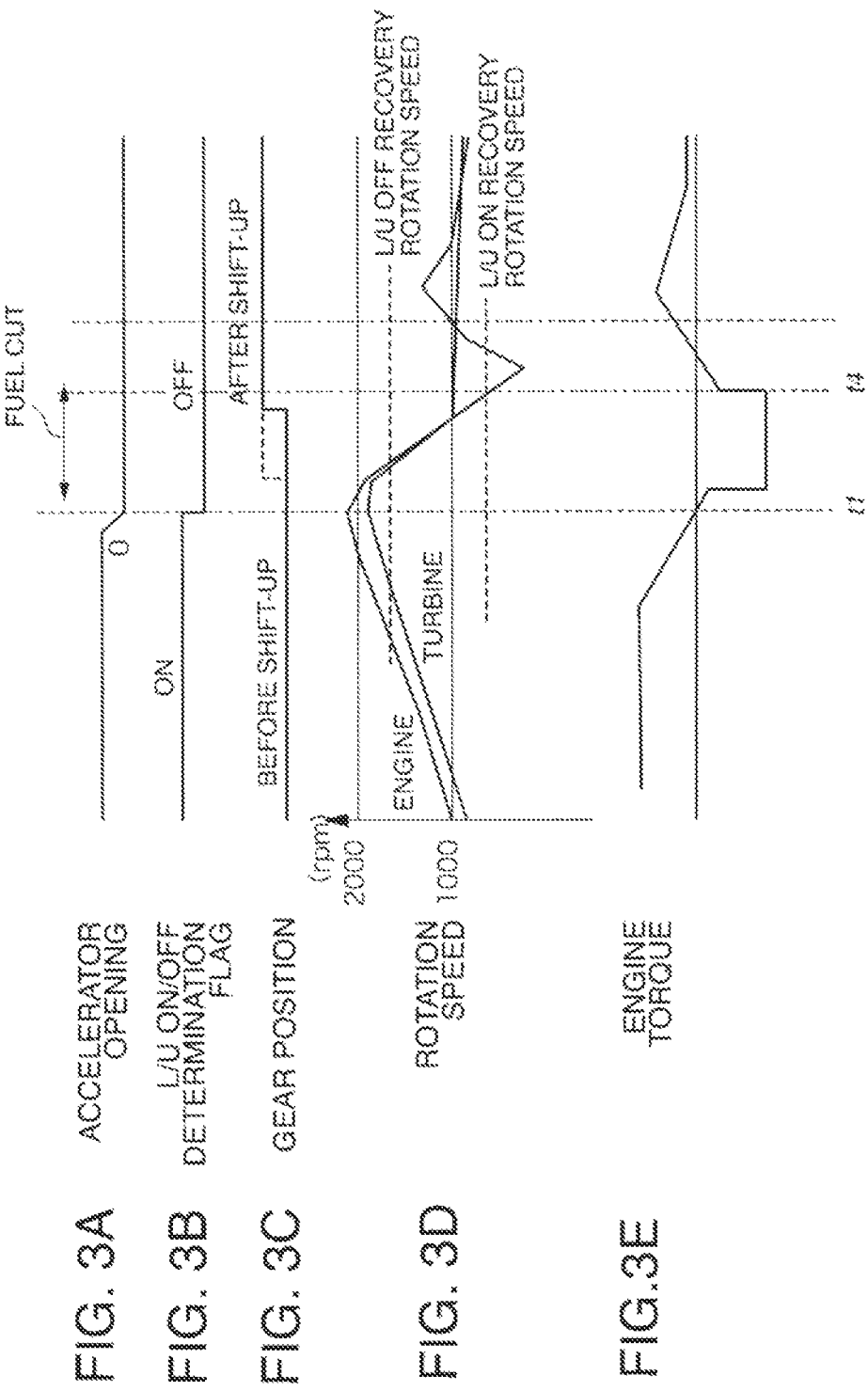

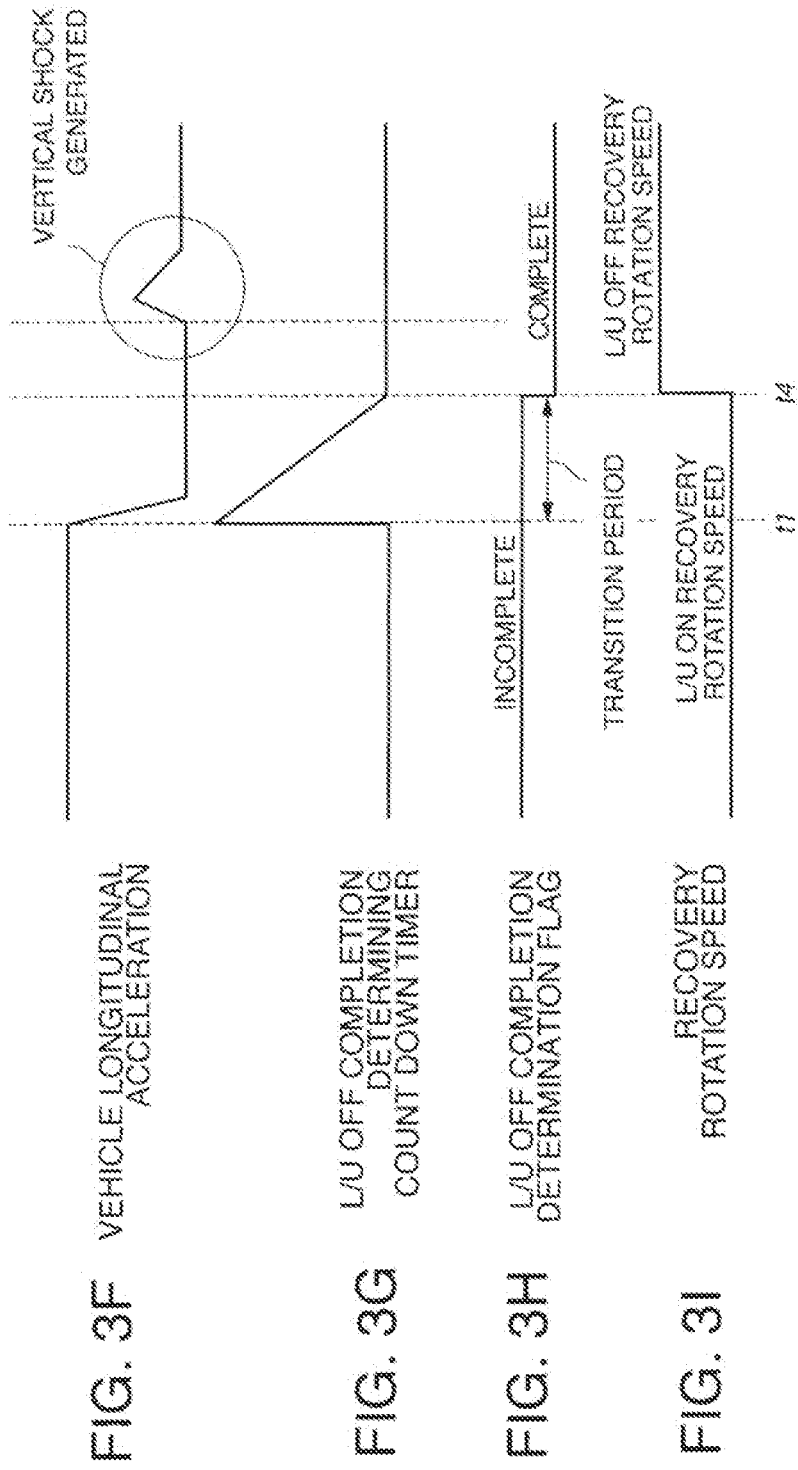

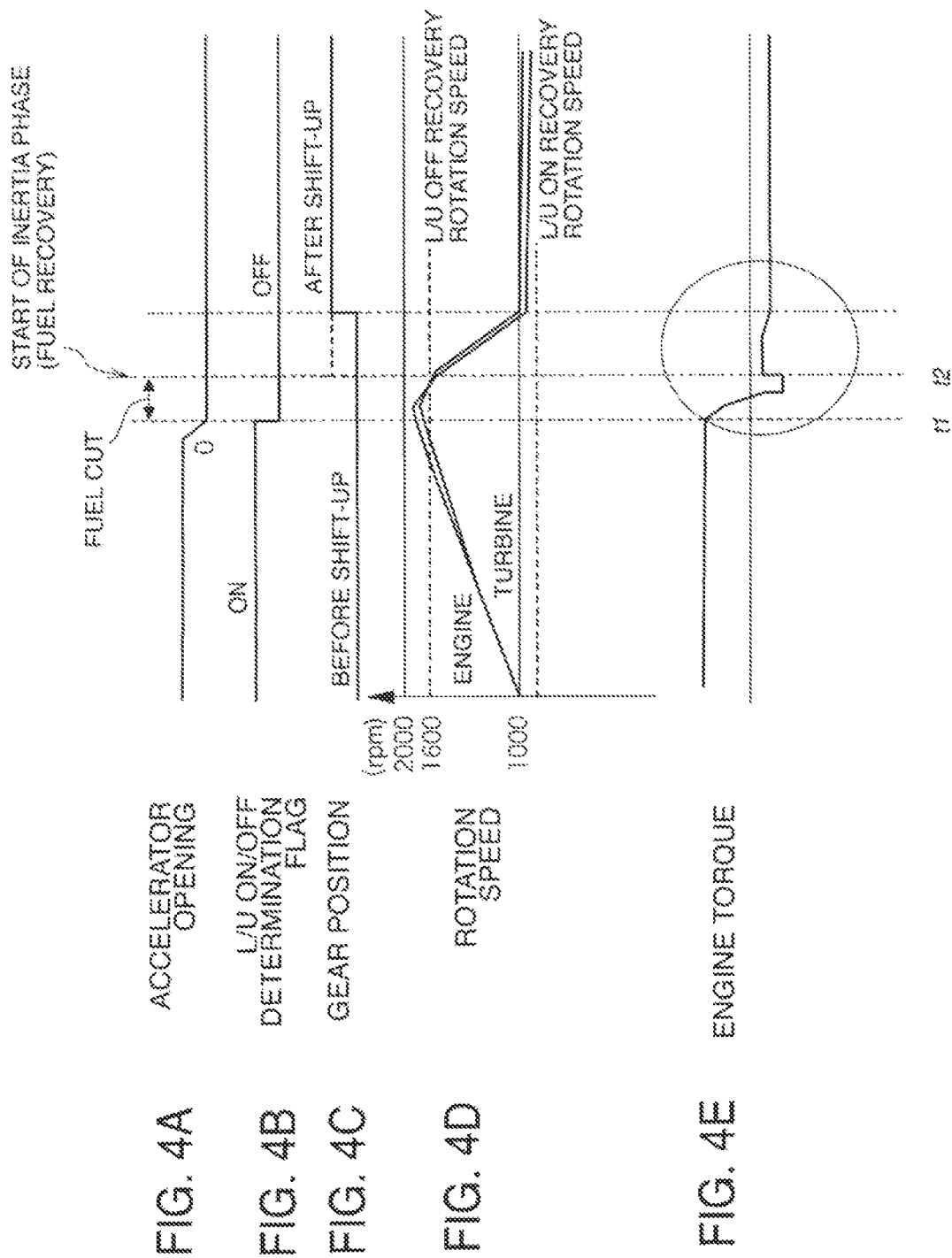

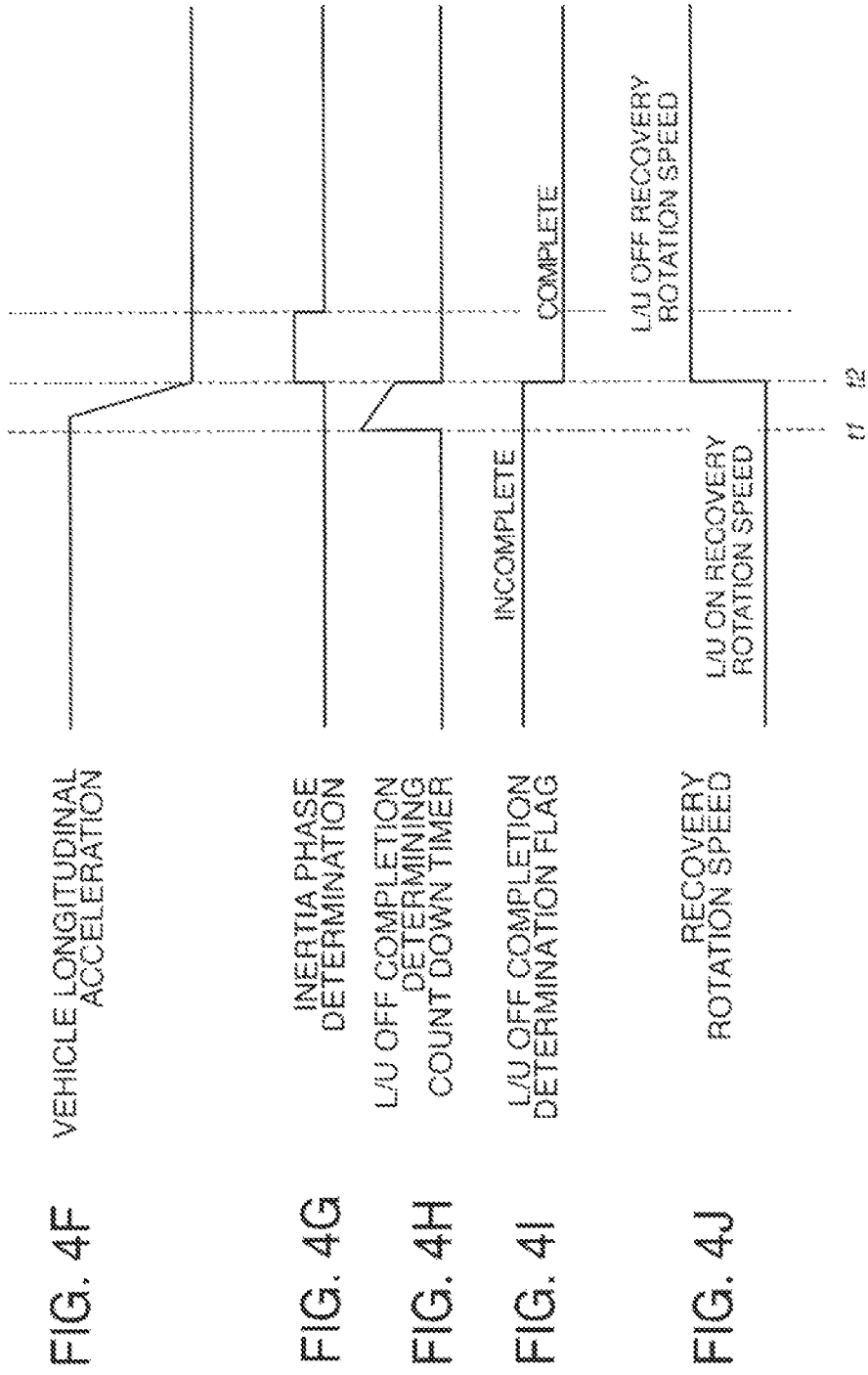

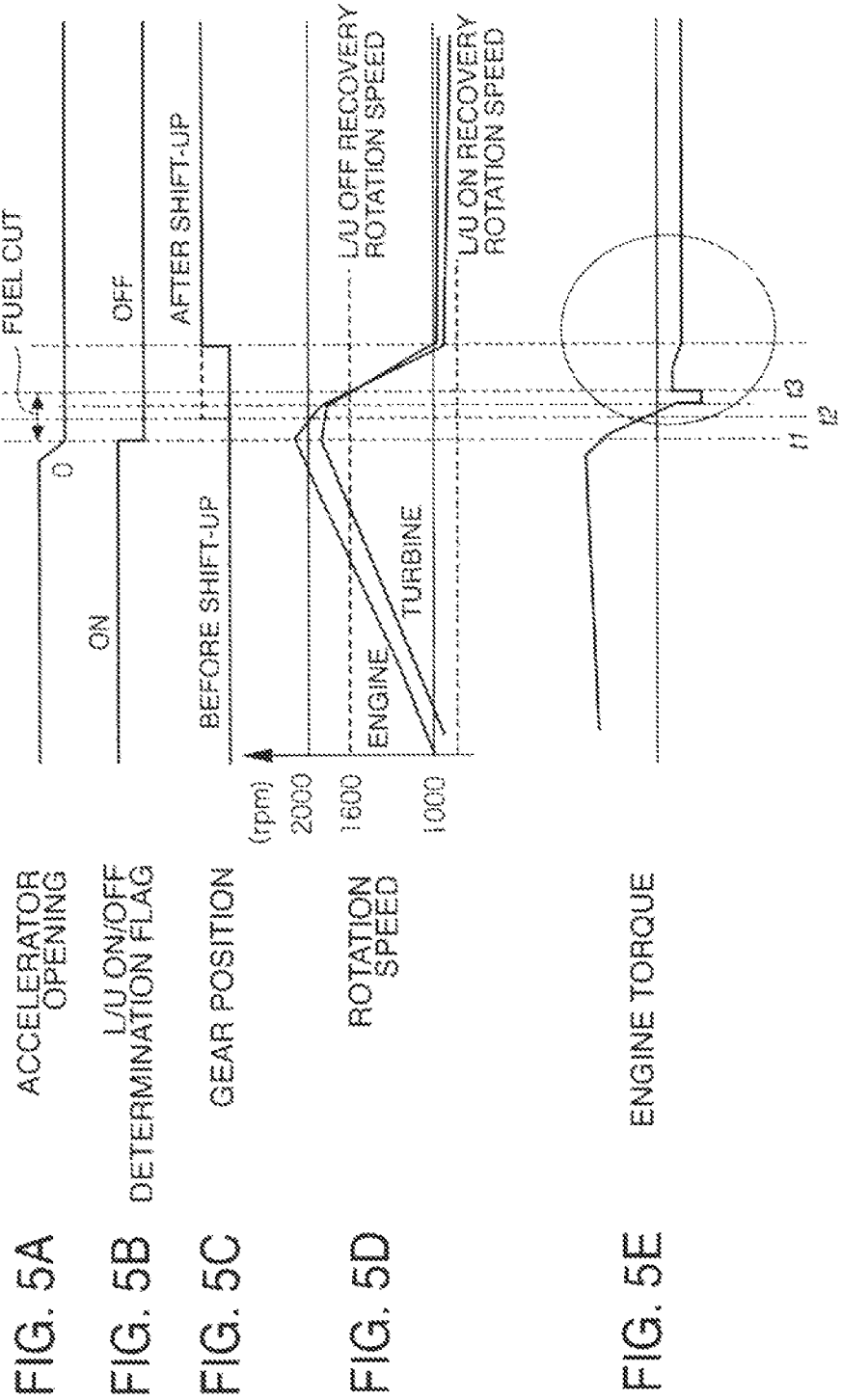

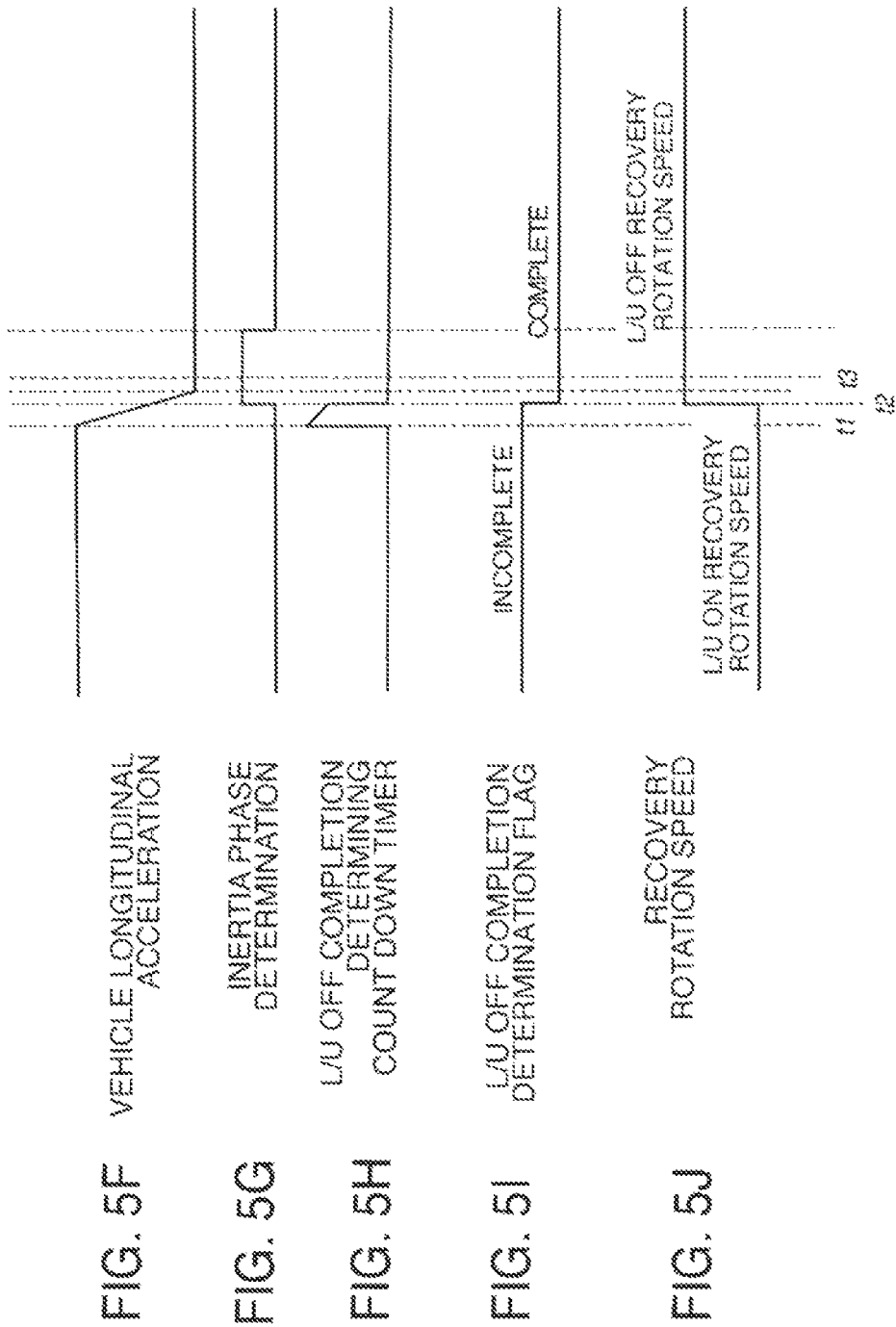

VEHICLE DRIVING DEVICE AND VEHICLE DRIVING METHOD

FIELD Of THE INVENTION

This invention relates to a driving force control in a vehicle having a stepped automatic transmission.

BACKGROUND OF THE INVENTION

When a vehicle in which an output power of an internal combustion engine is transmitted to drive wheels via an automatic transmission and a torque converter having a lockup clutch performs coast running in which an accelerator pedal is not depressed, a known driving force control in which the lockup clutch is unlocked and a fuel supply to the internal combustion engine is prevented may be applied to suppress fuel consumption.

When a rotation speed of the internal combustion engine has decreased to a set value as a result of preventing fuel supply, fuel supply to the internal combustion engine is resumed. Herein, prevention of fuel supply to the internal combustion engine is so-called a "fuel-cut," and resumption of fuel supply to the internal combustion engine is so-called a "fuel recovery" or simply a "recovery."

JP 2006-015819 A, published by The Japan Patent Office in 2006, proposes to apply a regenerative braking when a fuel recovery operation is performed, thereby preventing a torque shock from being generated in a state where the lockup clutch is unlocked.

SUMMARY OF THE INVENTION

If a driver releases the accelerator pedal during a vehicle running while the lockup clutch is locked, it is possible that a so-called foot release shift-up operation in which the lockup clutch is unlocked and the automatic transmission is shifted to a higher-speed gear may be performed. In this case also, since the accelerator opening is zero, a fuel-cut operation is performed to prevent fuel supply to the internal combustion engine.

During the foot release shift-up operation, the engine rotation speed decreases due to the fuel-cut operation. If a fuel recovery operation is performed while the lockup clutch is unlocked, a rotation speed of the internal combustion engine abruptly rises. As a result, a driving torque transmitted to the drive wheels via the torque converter also abruptly increases, and this generates a shock in a longitudinal direction of the vehicle. This shock may make a driver or a passenger of the vehicle feel uncomfortable.

It is therefore an object of this invention to prevent a shock generated by the fuel recovery operation during a foot release shift-up operation without using a regenerative braking.

In order to achieve the above object, this invention applies to a vehicle driving device that transmits a rotation of an internal combustion engine that is responsive to a depression amount of an accelerator pedal to a drive wheel of vehicle via a torque converter and an automatic transmission The device comprises an accelerator pedal depression sensor that detects the depression amount of the accelerator pedal, an engine rotation speed sensor that detects a rotation speed of the internal combustion engine, and a programmable controller.

The controller is programmed to perform a shift-up operation of the automatic transmission when the accelerator pedal is released while the vehicle is running, perform a fuel-cut operation of the internal combustion engine when the engine rotation speed is equal to or higher than a predetermined recovery rotation speed in a state where the accelerator pedal is released, perform a fuel recovery operation of the internal combustion engine when the engine rotation speed falls below the predetermined recovery rotation speed in a state where the fuel-cut operation is performed, predict if the fuel recovery operation is to be performed when the fuel-cut operation and the shift-up operation are performed in parallel, determine if the automatic transmission is in an inertia phase, and perform the fuel recovery operation of the internal combustion engine in advance in the inertia phase of the automatic transmission when the fuel recovery operation of the internal combustion engine is predicted to be performed.

The details as well as other features and advantages of this invention are set forth in the remainder of the specification and are shown in the accompanying drawings.

BRIEF DESCRIPTION OF THE DRAWINGS

FIGS. 3A to 3I are timing charts illustrating a driving force control result obtained without executing the driving force control routine;

FIGS. 4A to 4J are timing charts illustrating a driving force control result obtained by executing the driving force control routine; and FIGS. 5A to 5J are timing charts illustrating another driving force control result obtained by executing the driving force control routine.

DESCRIPTION OF THE PREFERRED EMBODIMENTS

Figure 1:
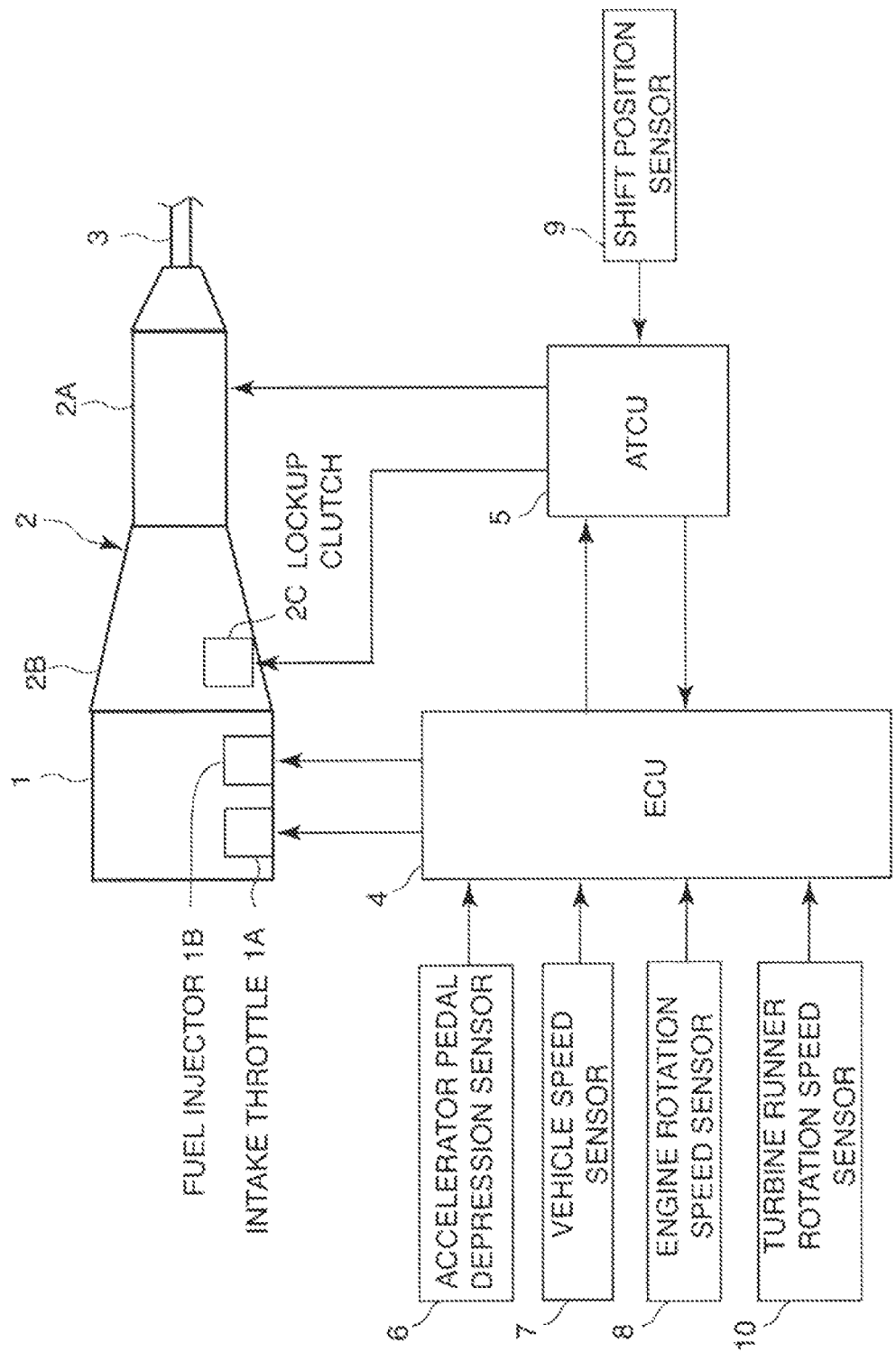
FIG. 1 is a schematic diagram of a vehicle driving device according to an embodiment of the invention.

Referring to FIG. 1 of the drawings, a vehicle driving device according to an embodiment of this invention comprises an internal combustion engine 1 and a speed change unit 2 that transmits a rotation output from the internal combustion engine 1 to a propeller shaft 3 after changing a rotation speed thereof.

The internal combustion engine 1 comprises an intake throttle 1A and a fuel injector 1B.

The speed change unit 2 comprises a torque converter 2B, an automatic transmission 2A that changes the rotation speed output from the torque converter 2B, and hydraulic lockup clutch 2C.

The torque converter 2B comprises a pump impeller coupled to a rotation shaft of the internal combustion engine 1 and a turbine runner coupled to an input shaft of the automatic transmission 2A. The torque converter 2B transmits a torque using a hydraulic fluid between the pump impeller and the turbine runner. The automatic transmission 2A is a planetary gear set comprising a high clutch and a low brake as known in the art.

The lockup clutch 2C directly couples the pump impeller and the turbine runner when it is locked. When the lockup clutch 2C is unlocked, a relative rotation between the pump impeller and the turbine runner is allowed.

Locking/unlocking of the lockup clutch 20 and engagement/disengagement of the high clutch and the low brake of the automatic transmission 2A are performed by the automatic transmission controller (ATCU) 5 using a pumping pressure of a hydraulic pump provided as an accessory of the internal combustion engine 1.

An opening of the intake throttle 1A for adjusting an intake air amount of the internal combustion engine 1 and a fuel injection by the fuel injector 1B of the internal combustion engine 1 are respectively controlled by an engine controller (ECU) 4.

Each of the ECU 4 and the ATCU 5 is constituted by a microcomputer comprising a central processing unit (CPU), a read-only memory (ROM), a random access memory (RAM), and an input/output Interface (I/O interface). One or both of the ECU 4 and the ATCU 5 may comprise a plurality of microcomputers. Alternatively, the ECU 4 and the ATCU 5 may be integrated into a single microcomputer.

The ECU 4 receives, via a signal circuit, detection data from an accelerator pedal depression sensor 6 that detects a depression amount (accelerator opening) of an accelerator pedal of a vehicle, a vehicle speed sensor 7 that detects a vehicle running speed, and an engine rotation speed sensor 8 that detects a rotation speed of the internal combustion engine 1.

The ATCU 5 receives detection data from a shift position sensor 9 that detects a shift position of a selector lever provided in a vehicle via a signal circuit.

In the configuration described above, as the accelerator pedal is released during a vehicle running while the lockup clutch 2C is locked, the ATCU 5 outputs a signal for instructing a release operation of the lockup clutch 2 and a signal for instructing a shift-up operation of the automatic transmission 2A depending on a driving condition such as a vehicle running speed. At the same time, a L/U OFF completion determining countdown timer that determines whether or not the unlocking of the lockup clutch 2C is completed is reset to its predetermined initial value. The L/U OFF completion determining countdown timer is a timer that performs countdown at a constant rate from the initial value.

Referring to a flowchart shown in FIG. 2, a driving force control routine executed by the ECU 4 will be described. The ECU 4 repeatedly executes this routine during a vehicle running at a constant time interval of, for example, 10 milliseconds.

In a step S1, the ECU 4 determines whether or not the accelerator opening is at zero based on a signal input from the accelerator pedal depression sensor 6. If it is determined that the accelerator opening is not at zero, a fuel injection control for a normal accelerator opening is performed in a step 2, and then the routine is terminated.

If it is determined that the accelerator opening is at zero in the step S1, the ECU 4 determines whether or not a L/U ON/OFF determination flag is set to OFF in a step S3. The L/U ON/OFF determination flag is a flag indicating whether or not an unlocking operation of the lockup clutch 2 is instructed. The ATCU 5 is programmed in advance to instruct to unlock the lockup clutch 2C as soon as the accelerator opening becomes zero as described above.

If the L/U ON/OFF determination flag is not set to OFF in the step S3, it means that the lockup clutch is locked. In this case, the ECU 4 sets the recovery rotation speed to an L/U ON recovery rotation speed in a step S8, and then, the processing in a step S9 is executed. If the L/U ON/OFF determination flag is set to OFF in the step S3, the ECU 4 executes the processing of a step S4.

The recovery rotation speed is an engine rotation speed serving as a reference in the fuel-cut operation and the fool recovery operation. In the fuel recovery operation, the fuel supply is resumed from a fuel supply cut-off state caused by the fuel-cut operation. The ECU 4 executes the fuel-cut operation when the accelerator opening is at zero, and the engine rotation speed is higher than the recovery rotation speed. In addition, if the engine rotation speed becomes lower than the recovery rotation speed during the fuel-cut operation, the fuel recovery operation is executed. The recovery rotation speed is set to a different value depending on a locking state of the lockup clutch 2C. Specifically, when the lockup clutch 2C is unlocked, the L/U OFF recovery rotation speed is applied as the recovery rotation speed. Otherwise, that is, when the lockup clutch 2C is locked, or in the course of unlocking of the lockup clutch 2C, the L/U ON recovery rotation speed is applied as the recovery rotation speed. The L/U ON recovery rotation speed is set to, for example, approximately 800 revolutions per minute (rpm), and the L/U OFF recovery rotation speed is set to, for example, approximately 1600 rpm.

In the step S4, the ECU 4 determines whether or not the L/U OFF completion determining countdown timer is set to a non-zero value.

A certain time interval is necessary until the lockup clutch 2C is completely unlocked after there is an instruction for unlocking the locked lockup clutch 2C. The L/U OFF countdown timer detects that a certain time elapses after the L/U ON/OFF determination flag is reset to OFF by performing a countdown. The ECU 4 determines that the lockup clutch 2C is completely unlocked when the value of the L/U OFF completion determining countdown timer becomes zero. If the value of the L/U OFF completion determining countdown timer is non-zero, the ECU 4 determines that the lockup clutch 2C is in the course of the unlocking operation.

If the L/U OFF completion determining countdown timer is a non-zero value in the step S4, the ECU 4 performs the processing in a step S5. When the L/U OFF completion determining countdown timer is at zero, the ECU 4 performs the processing of the step S7.

In the step S5, it is determined whether or not the fuel recovery condition is satisfied. The fuel recovery condition is satisfied only when the following conditions are entirely satisfied.

a) Is the shift-up control operation under execution?
b) Is the automatic transmission 2A in an inertia phase?
c) Is a rotation speed of the internal combustion engine 1 after the shift-up operation lower than the L/U OFF recovery rotation speed?

For the condition a), it is determined whether or not a shift-up instruction is output from the ATCU 5. The determination for the condition b) has the following meanings.

During a shift-up or shift-down operation of the automatic transmission 2A, an internal clutch and the brake are engaged or disengaged. During this operation, a real speed ratio is between an Nth gear level and a (N+1)th gear level. In the inertia phase, only the engine rotation speed changes even when the fuel recovery operation is performed. Therefore, an influence on an output shaft torque of the automatic transmission 2A is negligible, and thus a driver or a passenger does not feel a shock.

Accordingly, it is possible to prevent a shock by performing the fuel recovery operation in the inertial phase when the fuel-cut operation is executed. Whether or not the automatic transmission 2A is in the inertia phase may be determined based on various methods.

For example, an input rotation speed A of the automatic transmission 2A in the Nth gear level before a shift-up operation, an input rotation speed B of the automatic transmission 2A corresponding to the (N+1)th gear level after the shift-up operation under the same output rotation speed, and a real input rotation speed C of the automatic transmission 2A are detected or computed. The input rotation speed A of the automatic transmission 2A may be computed based on a vehicle speed detected by the vehicle speed sensor 7 and a speed ratio of the automatic transmission after the shift-up operation. The real input rotation speed C of the automatic transmission 2A is equal to the rotation speed of the turbine runner detected by the turbine runner rotation speed sensor 10. If the real input rotation speed C is higher than the input rotation speed B and is lower than the input rotation speed A, it may be determined that the automatic transmission 2A is in the inertia phase.

If the real speed ratio computed based on the real input rotation speed and the real output rotation speed of the automatic transmission 2A is between the speed ratio before the speed change and the speed ratio after the speed change, it can be determined that the automatic transmission 2A is in the inertia phase. Here, the input rotation speed of the automatic transmission 2A is equal to the rotation speed of the turbine runner, and the output rotation speed of the automatic transmission 2A can be computed based on the vehicle speed detected by the vehicle speed sensor 7.

As described above, it is possible to easily determine the inertia phase by using the speed ratio or the input/output rotation speed of the automatic transmission 2A as a threshold value. Other alternative methods may also be used to determine the inertia phase.

For the condition c), the rotation speed $Ne_{(N+1)}$ of the internal combustion engine 1 after the shift-up operation is computed by multiplying the speed ratio of the automatic transmission ((N+1)th speed level) after the shift-up operation and a current vehicle running speed. This calculation corresponds to means for predicting an engine rotation speed. Then, it is determined whether or not the rotation speed $Ne_{(N+1)}$ of the internal combustion engine 1 after the shift-up operation is lower than the L/U OFF recovery rotation speed.

Determination in the step S5 has the following meaning.

Specifically, in the foot release shift-up operation, the fuel-cut operation and the shift-up operation are performed as the accelerator opening becomes zero. If the rotation speed of the internal combustion engine 1 after the shift-up operation is lower than the recovery rotation speed, the fuel recovery operation is executed. As the fuel recovery operation is executed immediately after the shift-up operation, a torque delivered to the drive wheels abruptly increases. This may make a driver or a passenger feel shock as a change in a vehicle longitudinal acceleration.

However, when the automatic transmission 2A is in the inertia phase in the course of shifting from the Nth speed level to the (N+1)th speed level, a change of the output torque of the automatic transmission 2A output to the propeller shaft 3 is negligible even when the fuel recovery operation is also performed. As a result, a change in the vehicle longitudinal acceleration is negligible, and a driver or a passenger does not feel a shock.

In this regard, in order to prevent a shock, it is preferable that the fuel-cut operation be suppressed when the fuel supply is not cut off in the foot release shift-up operation, and the fuel recovery operation be performed during the inertia phase when the fuel supply has been cut off already. In the step S5, a determination is made as to whether or not this processing should be performed.

If the fuel recovery condition is satisfied in the step S5, the ECU 4 resets the L/U OFF completion determining countdown timer to a zero in a step S6. Then, in a step S7, the recovery rotation speed is set to the L/U OFF recovery rotation speed higher than the L/U ON recovery rotation speed. Since the recovery rotation speed is increased to the L/U OFF recovery rotation speed, the subsequent fuel-cut is efficiently restricted. In addition, when the fuel supply has been cut off already, the fuel recovery operation is promoted.

In the step S5, when the fuel recovery condition is not satisfied, the ECU 4 sets the recovery rotation speed to the L/U ON recovery rotation speed in the step S8 and then executes the processing of the step S9.

In steps S9 to S11, a typical fuel-cut execution algorithm is executed.

Specifically, in the step S9, the ECU 4 determines whether or not the engine rotation speed is equal to or higher than the recovery rotation speed. If it the determination is affirmative, the fuel-cut operation is executed in the step S10. If the determination is negative, the fuel-cut operation is prohibited in the step S11, and fuel injection is executed for the condition where the accelerator opening is zero. The processing of the step S11 means that the fuel recovery operation is performed if the fuel-cut operation is under execution. Meanwhile, the processing of the step S10 means prohibition of the fuel-cut operation if the fuel-cut operation is not under execution. After the processing of the step S10 or the step S11, the ECU 4 terminates the routine.

Here, the recovery rotation speed used in the determination in the step S9 is set equal to the L/U OFF recovery rotation speed if the process has experienced the processing of the step S7. Meanwhile, the recovery rotation speed used in the determination in the step S9 is set equal to the L/U ON recovery rotation speed if the process has experienced the processing of the step S8. The process experiences the processing of the step S7 only when the fuel recovery condition of the step S5 is satisfied.

If the recovery rotation speed is set to the L/U OFF recovery rotation speed of approximately 1600 rpm, the fuel-cut operation is not performed unless the engine rotation speed becomes equal to or higher than approximately 1600 rpm. That is, when the fuel recovery condition is satisfied, the execution of the fuel-cut operation is strongly restricted. In addition, if the fuel recovery condition is satisfied while the fuel-cut operation has been already performed, and the engine rotation speed is lower than approximately 1600 rpm, the fuel recovery operation is performed without fail.

In this manner, if the fuel recovery condition is satisfied in the foot release shift-up operation, the recovery rotation speed is increased to the L/U OFF recovery rotation speed. As a result, it is possible to suppress the fuel-cut operation and easily perform the fuel recovery operation during the inertia phase without directly controlling the output signal to the fuel injector 1B.

It should be noted that the L/U OFF completion determining countdown timer is reset to zero in the step S6 before the recovery rotation speed is set to the L/U OFF recovery rotation speed in the step S7. For this reason, in the subsequent routine execution, the determination in the step S4 changes to be negative. The recovery rotation speed is maintained at the L/U OFF recovery rotation speed until the determinations in both the steps S1 and S3 are changed to be negative by depressing and releasing the accelerator pedal, and the recovery rotation speed is set to the L/U ON recovery rotation speed in the step S8.

If the fuel-cut operation is performed during the foot release shift-up operation, and the fuel recovery operation is performed after the shift-up operation, a rotation speed of the internal combustion engine 1 may abruptly rise, so that a driving torque of the drive wheels output to the propeller shaft 3 significantly changes. This change may generate a shock of a vehicle and may make a driver or a passenger feel uncomfortable. In this driving force control device, when it is predicted that the engine rotation speed after the shift-up operation is lower than the recovery rotation speed, that is, when the fuel-cut operation is suppressed by increasing the fuel recovery rotation speed to the L/U OFF recovery rotation speed in the inertia phase. In addition, when the fuel-cut operation has already started, the fuel recovery operation is performed during the inertia phase. Therefore, it is possible to prevent a shock caused by the fuel recovery operation performed in the foot release shift-up operation.

It should be noted that the fuel recovery condition is satisfied only when it is predicted that the rotation speed of the internal combustion engine 1 after the shift-up operation is lower than the recovery rotation speed under the inertia phase of the automatic transmission 2A in the so-called foot release shift-up operation, in which the accelerator pedal of the vehicle is released during a vehicle running, and the automatic transmission 2A is shifted up. Since the fuel-cut operation is suppressed, and the fuel recovery operation is performed under such a restricted condition, it is possible to prevent a shock generated by the fuel recovery operation immediately after the shift-up operation and an increase in the fuel consumption caused by unnecessary fuel injection.

Figure 2:
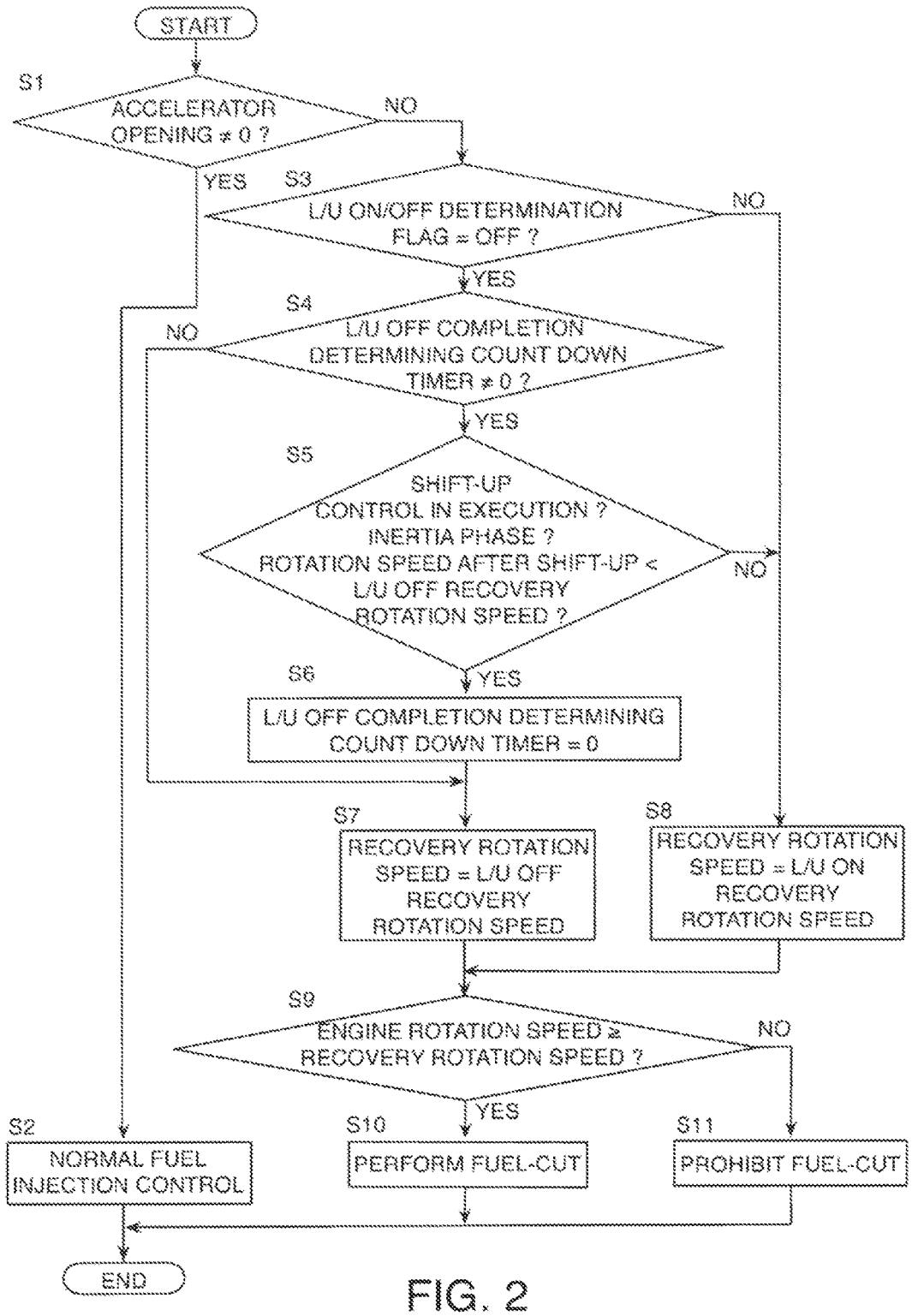
FIG. 2 is a flowchart illustrating a driving force control routine executed by an engine controller according to the embodiment of this invention.

Referring to FIGS. 3A to 3I, 4A to 4J, and 5A to 5J, a change of the engine torque and generation of a chock will be compared depending on whether or not the driving force control routine of FIG. 2 is executed.

FIGS. 3A to 3I illustrates a result of the foot release shift-up operation when the driving force control routine of FIG. 2 is not executed. Even when the driving force control routine of FIG. 2 is not executed, the recovery rotation speed switches between L/U ON recovery rotation speed and the L/U OFF recovery rotation speed depending on the L/U OFF completion determining countdown timer. In other words, the steps S5 and S6 are omitted from the driving force control routine of FIG. 2, and the step S8 is executed when the determination is affirmative in the step S4. As a result, as illustrated in FIGS. 3A to 3I, the fuel-cut operation and the fuel recovery operation are performed such that the recovery rotation speed is set to the L/U OFF recovery rotation speed if the lockup clutch 2C is completely unlocked. Otherwise, the recovery rotation speed is set to the L/U ON recovery rotation speed. However, herein, reselling of the L/U OFF completion determining countdown timer depending on the fuel recovery condition is not performed. The L/U OFF completion determining countdown timer is reset only after the completion of the L/U OFF determining countdown is completed as illustrated in FIG. 3G.

As the accelerator opening becomes zero at a timing t1 as illustrated in FIG. 3A, the L/U ON/OFF determination flag is reset to OFF as illustrated in FIG. 3B. As a result, an unlock instruction is transmitted to the lockup clutch 2C, and a shift-up instruction is transmitted to the automatic transmission 2A. At the same time, as illustrated in FIG. 3G, the L/U OFF completion determining countdown tinier starts. Meanwhile, since the accelerator opening is zero, the fuel-cut operation is automatically executed if the engine rotation speed is higher than the L/U ON recovery rotation speed of approximately 800 rpm as illustrated in FIG. 3D. As a result, as illustrated in FIG. 3E, the engine torque decreases.

As illustrated in FIG. 3D, the engine rotation speed becomes lower than the recovery speed, the fuel recovery operation is executed, so that the engine torque abruptly rises from a temporary steep decrease state as illustrated in FIG. 3E. This change generates a fluctuation in the vehicle longitudinal acceleration as indicated by the circle of FIG. 3F, so that a shock is generated in the vehicle. It should be noted that, even in this case, the L/U OFF completion determining countdown timer becomes zero at a timing t4 as illustrated in FIG. 3G, and the recovery rotation speed is switched to the L/U OFF recovery rotation speed as illustrated in FIG. 3I after the L/U OFF completion determination flag is perfectly switched to the L/U OFF completion state.

FIGS. 4A to 4J illustrate a result of the foot release shift-up operation when the driving force control routine of FIG. 2 is executed. In these figures, the fuel-cut operation is executed before the automatic transmission 2A starts to perform a shift-up operation.

Herein, as illustrated in FIGS. 4A to 4D, if the accelerator pedal is released, and the accelerator opening becomes zero at a timing t1, an unlock operation of the lockup clutch 2C and a shift-up operation of the automatic transmission 2A are instructed. At this time, since the automatic transmission 2A is not in the inertia phase, the determination in the step S5 is negative In this regard, the L/U ON recovery rotation speed of approximately 800 rpm is set as the recovery rotation speed in the step S8, and it is determined whether or not the fuel-cut operation should be performed in the step S9. Herein, as illustrated in FIG. 4D, since the engine rotation speed is higher than the recovery rotation speed, the fuel-cut operation is performed in the step S10. As a result, the engine torque decreases as illustrated in FIG. 4E.

At a timing t2, as illustrated in FIG. 4G, determination on the inertia phase of automatic transmission 2A performed in the step S5 changes to be affirmative. In this case, if the engine rotation speed after the shift-up operation computed based on the aforementioned method is lower than the L/U OFF recovery rotation speed of 1600 rpm, the fuel recovery condition in the step S5 is satisfied. As the fuel recovery condition is satisfied, the ECU 4 resets the L/U OFF completion determining countdown timer to zero in the step S6 and sets the recovery rotation speed to the L/U OFF recovery rotation speed of approximately 1600 rpm in the step S7 as illustrated in FIG. 4J.

As a result, the determination in the next the step S9 changes to be negative and the fuel recovery operation is immediately performed in the step S11. Since the fuel recovery operation is performed as the inertia phase starts, there is not influence on the output torque of the automatic transmission 2A while the engine torque increases as illustrated in FIG. 4E. Therefore, a change in the vehicle longitudinal acceleration is not generated as illustrated in FIG. 4F, and a driver or a passenger does not feel a shock.

In this manner, if it is predicted that the fuel recovery operation is performed immediately after the shift-up operation even when the foot release shift-up operation of the automatic transmission 2A is performed, the timing of the fuel recovery operation is expedited by switching the recovery rotation speed to the L/U OFF recovery rotation speed higher than the L/U ON recovery rotation speed as illustrated in FIG. 4J, so that the fuel recovery operation is performed during the inertia phase of the automatic transmission 2A. In addition, when the fuel-cut operation is not performed, the fuel-cut operation is strongly restricted. For this reason, a shock of a vehicle caused by the fuel recovery operation immediately after the shift-up operation generated in the case of FIGS. 3A to 3I is not generated as illustrated in FIG. 4F, and a driver or a passenger does not feel uncomfortable.

FIGS. 5A to 5J also illustrate a result of the foot release shift-up operation when the driving force control routine of FIG. 2 is executed. FIGS. 5A to 5J illustrate a case where the shift-up operation of the automatic transmission 2A starts before the fuel-cut operation by performing the foot release shift-up operation while the engine rotation speed is higher than that of FIGS. 4A to 4J.

When the accelerator pedal is released and the accelerator opening becomes zero at a timing t1 as illustrated in FIGS. 5A to 5C, an unlock operation of the lockup clutch 2C and a shift-up operation of the automatic transmission 2A are instructed.

At a timing t2, the inertia phase is determined. In the step S6, the L/U OFF completion determining countdown timer is reset to zero. In the step S7, the recovery rotation speed is incremented to the L/U OFF recovery rotation speed of approximately 1600 rpm. However, since the engine rotation speed is higher than the recovery rotation speed at this timing as illustrated in FIG. 5D, the determination in the step S9 is affirmative, and the fuel-cut operation is continuously performed in the step S10.

In the subsequent routine execution, the determination in the step S3 is affirmative sod the determination in the step S4 is negative. Hence, the recovery rotation speed is maintained at the lockup OFF recovery rotation speed of approximately 1600 rpm.

At a timing t3, the engine rotation speed becomes lower than the recovery rotation speed as illustrated in FIG. 5D. As a result, the determination in the step S9 changes to be negative so that the fuel recovery operation is performed in the step S11. In this step, the automatic transmission 2A is continuously in the inertia phase. Therefore, while the engine torque increases due to the fuel recovery operation, there is no influence on the output torque of the automatic transmission 2A. Accordingly, as illustrated in FIG. 5F, the fuel recovery operation does not generate a change in the vehicle longitudinal acceleration, and a driver or a passenger does not feel a shock.

After the timing t3, as long as the accelerator pedal is not depressed, the recovery rotation speed is maintained at the lockup OFF recovery rotation speed of approximately 1600 rpm. Therefore, it is possible to substantially suppress execution of the fuel-cut operation.

In the embodiment described above, the accelerator pedal depression senses 6 serves as means for detecting an accelerator pedal release, and the engine rotation speed sensor 8 serves as means for detecting an engine rotation speed. In addition, the ATCU 5 servers as means for performing a shift-up operation, and the ECU 4 serves as means for performing a fuel-cut operation, means for performing a fuel recovery operation, means for predicting a fuel recovery operation, means for determining an inertia phase, and means for performing the fuel recovery operation in advance.

It should be noted that a time lag might occur until the engine torque actually increases by the fuel recovery operation when the fuel recovery operation is executed in the step S11 of FIG. 2. Such a time lag can be canceled by adding a predetermined increment to an automatic transmission input rotation speed corresponding to a speed ratio after the speed change used to determine the inertia phase of the step S5, that is, the (N+1)th speed level. Therefore, it is possible to accurately control the timing for increasing the engine torque caused be the fuel recovery operation.

In the embodiment described above, the recovery rotation speed is increased to the lockup OFF recovery rotation speed when the fuel recovery condition is satisfied in the foot release shift-up operation. As a result, it is possible to control the fuel recovery operation depending on the locking/unlocking of the lockup clutch 2C. However, in the step S6, the recovery rotation speed may not necessarily be set equal to the lockup OFF rotation speed. In short, when the fuel recovery condition is satisfied in the foot release shift-up operation, the recovery rotation speed is preferably corrected in an increasing manner to perform the fuel recovery operation in advance.

According to this embodiment, the fuel recovery operation is performed in advance by correcting the recovery rotation speed in an increasing manner. As a result, it is possible to perform the fuel recovery operation in the inertia phase of the internal combustion engine 1 during the fuel-cut operation without changing a basic algorithm including the steps S9 to S11 for performing the fuel-cut operation and the fuel recovery operation in the fuel injector 1B. Alternatively, a signal for instructing the fuel recovery operation may be directly output to the fuel injector 1B when the fuel recover condition is satisfied in the foot release shift-up operation.

The contents of Tokugan 2011-198435, with a filing date of Sep. 12, 2011 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

As described above, according to the present invention, it is possible to prevent a shock caused by fuel recovery operation dining the foot release shift-up operation. Therefore, it is possible to improve a drive feeling of a vehicle such as an automobile.

The embodiments of this invention in which an exclusive property or privilege is claimed are defined as follows:

What is claimed is:

1. A vehicle driving device that transmits a rotation of an internal combustion engine that is responsive to a depression amount of an accelerator pedal to a drive wheel of a vehicle via a torque converter and an automatic transmission, comprising:
   an accelerator pedal depression sensor that detects the depression amount of the accelerator pedal;
   an engine rotation speed sensor that detects an engine rotation speed of the internal combustion engine; and
   a programmable controller programmed to:
      perform a shift-up operation of the automatic transmission when the accelerator pedal is released while the vehicle is running;
      perform a fuel-cut operation of the internal combustion engine in which fuel supply to the internal combustion engine is cut off when the engine rotation speed is equal to or higher than a predetermined recovery rotation speed in a state where the accelerator pedal is released;
      perform a fuel recovery operation of the internal combustion engine in which fuel supply to the internal combustion engine is resumed when the engine rotation speed falls below the predetermined recovery rotation speed in a state where the fuel-cut operation is performed;
      predict if the fuel recovery of the internal combustion engine is to be performed when the fuel-cut operation and the shift-up operation are performed in parallel;
      determine if the automatic transmission is in an inertia phase; and
      perform the fuel recovery operation of the internal combustion engine in advance in the inertia phase of the automatic transmission when the fuel recovery operation of the internal combustion engine is predicted to be performed.

2. The vehicle driving device according to claim 1, wherein the controller is further programmed to:
calculate the engine rotation speed after the shift-up operation on a basis of a gear ratio of the automatic transmission after the shift-up operation and a vehicle running speed, and
predict that the fuel recovery operation of the internal combustion engine is to be performed when the engine rotation speed after the shift-up operation is lower than the predetermined recovery rotation speed.

3. The vehicle driving device according to claim 1, wherein the controller is further programmed to perform the fuel recovery operation of the internal combustion engine in advance in the inertia phase of the automatic transmission by increase correcting the predetermined recovery rotation speed.

4. The vehicle driving device according to claim 3, wherein
the device further comprises a lockup clutch that performs a lockup and an unlock operations of the torque converter, and
the controller is further programmed to:
shift the predetermined recovery rotation speed between a lockup OFF recovery rotation speed that is applied in an unlock state of the lockup clutch, and a lockup ON recovery rotation speed that is lower than the lockup OFF recovery rotation speed and applied in a lockup state of the lockup clutch, and
increase correct the predetermined recovery rotation speed by shifting the predetermined recovery rotation speed from the lockup ON recovery rotation speed to the lockup OFF recovery rotation speed.

5. The vehicle driving device according to claim 1, wherein the controller is further programmed to determine that the automatic transmission is in the inertia phase when a real input rotation speed of the automatic transmission falls between an input rotation speed of the automatic transmission before the shift-up operation and an input rotation speed of the automatic transmission after the shift-up operation calculated on the assumption that an output rotation speed of the automatic transmission does not vary by the shift-up operation.

6. The vehicle driving device according to claim 1, wherein the controller is further programmed to determine that the automatic transmission is in the inertia phase when a gear ratio calculated from a real input rotation speed and a real output rotation speed of the automatic transmission falls between a gear ratio before the shifting operation and a gear ratio after the shifting operation.

7. The vehicle driving device according to claim 5, wherein the controller is further programmed to increase correct the input rotation speed of the automatic transmission after the shift-up operation by a predetermined increment to cancel out a time lag.

8. A vehicle driving device that transmits a rotation of an internal combustion engine that is responsive to a depression amount of an accelerator pedal to a drive wheel of a vehicle via a torque converter and an automatic transmission, comprising:
means for detecting the depression amount of the accelerator pedal;
means for detecting an engine rotation speed of the internal combustion engine;
means for performing a shift-up operation of the automatic transmission when the accelerator pedal is released while the vehicle is running;
means for performing a fuel-cut operation of the internal combustion engine in which fuel supply to the internal combustion engine is cut off when the engine rotation speed is equal to or higher than a predetermined recovery rotation speed in a state where the accelerator pedal is released;
means for performing a fuel recovery operation of the internal combustion engine in which fuel supply to the internal combustion engine is resumed when the engine rotation speed falls below the predetermined recovery rotation speed in a state where the fuel-cut operation is performed;
means for predicting if the fuel recovery of the internal combustion engine is to be performed when the fuel-cut operation and the shift-up operation are performed in parallel;
means for determining if the automatic transmission is in an inertia phase; and
means for performing the fuel recovery operation of the internal combustion engine in advance in the inertia phase of the automatic transmission when the fuel recovery operation of the internal combustion engine is predicted to be performed.

9. A vehicle driving method that transmits a rotation of an internal combustion engine responsive to a depression amount of an accelerator pedal to a drive wheel of a vehicle via a torque converter and an automatic transmission, comprising:
detecting the depression amount of the accelerator pedal;
detecting an engine rotation speed of the internal combustion engine;
performing a shift-up operation of the automatic transmission when the accelerator pedal is released while the vehicle is running;
performing a fuel-cut operation of the internal combustion engine in which fuel supply to the internal combustion engine is cut off when the engine rotation speed is equal to or higher than a predetermined recovery rotation speed in a state where the accelerator pedal is released;
performing a fuel recovery operation of the internal combustion engine in which fuel supply to the internal combustion engine is resumed when the engine rotation speed falls below the predetermined recovery rotation speed in a state where the fuel-cut operation is performed;
predicting if the fuel recovery of the internal combustion engine is to be performed when the fuel-cut operation and the shift-up operation are performed in parallel;
determining if the automatic transmission is in an inertia phase; and
performing the fuel recovery operation of the internal combustion engine in advance in the inertia phase of the automatic transmission when the fuel recovery operation of the internal combustion engine is predicted to be performed.

* * * * *